United States Patent Office 3,006,923
Patented Oct. 31, 1961

3,006,923
PROCESS FOR PREPARING LEUCO SULFURIC ACID ESTERS OF VAT DYESTUFFS
Otto Fuchs, Fritz Meininger, and Friedrich Ische, Frankfurt am Main, Germany, assignors to Farbwerke Hoechst Aktiengesellschaft vormals Meister Lucius & Bruning, Frankfurt am Main, Germany, a corporation of Germany
No Drawing. Filed Sept. 16, 1958, Ser. No. 761,287
Claims priority, application Germany Sept. 19, 1957
10 Claims. (Cl. 260—316)

The present invention relates to an improved process for preparing leuco sulfuric acid esters of vat dyestuffs, especially those dyestuffs which on the usual esterification in pyridine in the presence of reducing agents form other products than the normal leuco compounds. The new process comprises reacting the leuco compound of the vat dyestuff or a metal salt of the leuco compound or a complex compound of the leuco compound with sulfur trioxide or a compound yielding sulfur trioxide in the presence of an organic carboxylic acid amide of the following constitution

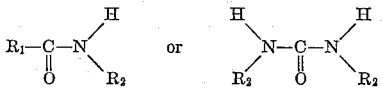

wherein $R_1$ represents an alkyl group and $R_2$ represents an alkyl or aryl group, if desired, in the presence of a diluent.

The great technical advantages in the production of dyeings and prints on textiles with the aid of leuco sulfuric acid esters of vat dyestuffs have been known for a long time. Many processes for preparing this important class of dyestuffs have been developed but only some of them have proved to be of value in practice.

It is known, for example, to prepare leuco sulfuric acid esters directly from the vat dyestuff by reacting the latter with a metal and sulfur trioxide or a compound yielding sulfur trioxide in the presence of a tertiary organic base. Furthermore, various bases have been proposed, which are especially suitable as medium for the reaction, such as pyridine, alpha-picoline or dimethylaniline.

According to the process described in British Patent No. 274,156 leuco sulfuric acid esters of vat dyestuffs can also be prepared by reacting a quaternary ammonium halide in the presence of a metal in a tertiary organic base suspension with a vat dyestuff, and then treating the mixture so obtained with a sulfatizing agent.

Furthermore, it has been proposed to conduct the esterification of vat dyestuffs in an aqueous medium with the use of esterifying agents that are stable in an aqueous alkaline suspension, for example the addition products of sulfur trioxide and tertiary aliphatic amines, such as trialkylamines or N-alkylmorpholines (U.S. Patent No. 2,403,226).

It has also been proposed to prepare leuco sulfuric acid esters of vat dyestuffs in the presence of an organic amide in which the two hydrogen atoms bound to the nitrogen atom are replaced by alkyl groups, such as dimethylformamide (U.S. Patent No. 2,604,477; German Patent No. 810,053).

Finally, U.S. Patent No. 2,774,761 describes a process for preparing sulfuric acid half esters of leuco vat dyestuffs in which a sulfur trioxide addition product of a dialkylcyanamide, preferably dimethylcyanamide, is used. It is indicated in this patent that cyanamide itself cannot be used for the esterification of vat dyestuffs which is obviously due to the presence of two hydrogen atoms at the amide nitrogen atom. For the same reason, formamide and acetamide, i.e. carboxylic acid amides, are also not suitable for preparing leuco sulfuric acid esters.

Now we have found that for the esterification of leuco vat dyestuffs there can preferably be used organic carboxylic acid amides in which one hydrogen atom bound to the nitrogen atom is replaced by a substituted or unsubstituted alkyl or aryl radical, the amides corresponding to the following formula

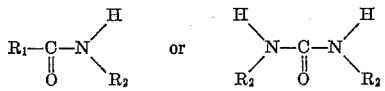

wherein $R_1$ represents an alkyl group and $R_2$ represents an alkyl or aryl group, such as N-methylacetamide, N-methylpropionamide, N-butylacetamide or N,N'-dimethyl urea.

The new process is suitably carried out by reacting the leuco compound of the vat dyestuff, or a metal salt of the leuco compound, or a complex compound of the leuco compound with sulfur trioxide or a compound yielding sulfur trioxide, such as chlorosulfonic acid, in the presence of an organic carboxylic acid amide of the constitution indicated above, in which one of the two hydrogen atoms bound to the nitrogen atom is replaced by an alkyl or aryl radical. The reaction can be conducted in the presence or absence of a diluent, such as acetone, methylene chloride, chlorobenzene, ethylene chloride or benzene.

It is surprising that the process of this invention could be performed since it had to be supposed that also the presence of one hydrogen atom at the amide nitrogen atom would prevent the formation of the leuco sulfuric acid ester, as is the case when cyanamide or formamide is used. The use of a carboxylic acid amide of the constitution indicated above or a mixture of two and more such compounds gives better yields in certain cases.

Moreover, vat dyestuffs which can hardly be esterified, can easily be converted into the corresponding leuco sulfuric acid esters. As vat dyestuff of this kind there is concerned a compound which on the usual esterification in pyridine in the presence of a reducing agent forms another product than the normal leuco compound. Vat dyestuffs which can hardly be esterified are also those dyestuffs the normal leuco compounds of which have a strong tendency to be converted into the corresponding keto- or oxanthrone form (cf. Melliand, Textilberichte 28, pages 93, 136 and 273 (1948)), such as anthrimides, anthrimide-carbazoles, for example 1,1',5,1''-trianthrimide-2,2',6,2''-carbazole or 4,5'-dibenzoylamino-1,1'-dianthrimide-2,2'''-carbazole, various acylaminoanthraquinones, such as 1,4-dibenzoylaminoanthraquinone or 1,5-dibenzoylamino-4,8-dihydroxyanthraquinone.

The leuco compound of the vat dyestuff can be prepared by a process described in the literature, or with special advantage for example by treating a finely dispersed vat dyestuff with a metal, such as zinc dust, iron or copper powder, and an anhydrous acid, such as glacial acetic acid, mono-, di-, or trichloroacetic acid, hydrochloric acid or propionic acid. The reduction can be carried out in the presence or absence of a diluent. When the reduction of the vat dyestuff is carried out in the absence of a diluent, it is suitable to remove the acid from the reaction mixture prior to the treatment of the leuco compound with the sulfatizing agent, for example by distillation under reduced pressure.

The dyeings and prints produced according to the usual methods with the leuco sulfuric acid esters obtainable by the present invention are distinguished especially by the purity of the tint and by very good fastness properties.

The following examples serve to illustrate the invention, but they are not intended to limit it thereto, the parts being by weight:

*Example 1*

14 parts of zinc dust and 16 parts of anhydrous acetic acid are introduced into a mixture of 20 parts of finely dispersed 1,1′,5,1″-trianthrimide-2,2′,6,2″-carbazole and 190 parts of ethylene chloride. The reaction mixture is stirred for 6 hours at 40° C. in a nitrogen atmosphere until the color has turned from yellow to black-brown. A mixture prepared at 0° C. from 100 parts of ethylene chloride, 120 parts of N-methylacetamide, and 60 parts of sulfur trioxide, is then added at 40° C. and the whole is stirred for 15 minutes at 55°–57° C. The mixture is then introduced into a sodium carbonate solution of 15% strength and distilled under reduced pressure. The zinc residue is removed by filtration and the leuco sulfuric acid ester is salted out in the form of a yellow precipitate by adding potassium chloride.

Example 2

11 parts of zinc dust are introduced into a mixture of 10 parts of finely dispersed 1,1′,5,1″-trianthrimide-2,2′,6,2″-carbazole and 110 parts of anhydrous acetic acid, and the whole is then stirred for 6 hours at 40° C. in a nitrogen atmosphere. When the reduction is complete, the acetic acid is completely distilled off under reduced pressure. A mixture of 150 parts of ethylene chloride, 60 parts of N-methylacetamide and 30 parts of sulfur trioxide is added to the remaining leuco compound and the whole is stirred for 30 minutes at 55° C. The mixture is then stirred into a sodium carbonate solution of 15% strength and distilled under reduced pressure. The leuco sulfuric acid ester is salted out from the solution after separation of the zinc residue.

Example 3

7 parts of zinc dust and 8 parts of glacial acetic acid are added to a suspension of 10 parts of finely dispersed 1,1′-dianthrimide-2,2′-carbazole in 170 parts of ethylene chloride. The mixture is stirred for 5 hours at 40° C. in a nitrogen atmosphere. When the reduction is complete, a mixture prepared at 0° C. from 110 parts of ethylene chloride, 100 parts of N-methylacetamide and 50 parts of sulfur trioxide is added at a temperature of 40° C. and the whole is stirred for 15 minutes at 45° C. The reaction mixture is then poured into an aqueous sodium carbonate solution, filtered, and the yellow filtrate is repeatedly extracted by shaking with ethylene chloride or benzene. The leuco sulfuric acid ester is salted out from the yellow colored, aqueous solution with potassium chloride.

Example 4

14 parts of zinc dust and 18 parts of anhydrous acetic acid are added to a suspension of 20 parts of finely dispersed dimethoxydibenzanthrone in 160 parts of ethylene chloride, the mixture is then stirred for 5 hours at 40° C. in a carbon dioxide atmosphere. The red leuco compound so obtained is converted into the leuco sulfuric acid ester by adding at 40° C. a mixture of 100 parts of ethylene chloride, 120 parts of N-methylacetamide and 60 parts of sulfur trioxide and stirring for 15 minutes at 40° C. The red reaction product is introduced into an excess of sodium carbonate solution of 15% strength and freed from ethylene chloride by distillation under reduced pressure. The zinc residue is filtered off and the leuco sulfuric acid ester of the dyestuff is separated from the red filtrate by addition of salt.

Instead of the anhydrous acetic acid there may also be used 20 parts of propionic acid or chloroacetic acid.

Example 5

A mixture of 100 parts of ethylene chloride, 120 parts of N-methylacetamide and 40 parts of sulfur trioxide is added at 40° C. to a suspension of 22.5 parts of leuco-2,9-dibromodibenzpyrene-7,14-dione in 200 parts of ethylene chloride. The esterification mixture is stirred for 25 minutes at 40° C. and then poured into a sodium carbonate solution of 15% strength. The ethylene chloride is distilled off and the zinc residue is removed by filtration. The leuco sulfuric acid ester is salted out from the filtrates by adding sodium chloride.

Example 6

10 parts of 4,5,4′,5′-dibenzthioindigo in 105 parts of chlorobenzene are reduced for 6 hours at 40° C. by adding 7 parts of zinc dust and 8 parts of glacial acetic acid. At the same temperature there is then added a sulfatizing mixture prepared at 0° C. from 50 parts of ethylene chloride, 60 parts of N-methylacetamide and 20 parts of sulfur trioxide. The mixture is stirred for 15 minutes at 40° C. and the yellow reaction mixture is then poured into an aqueous sodium carbonate solution. Chlorobenzene, ethylene chloride and the zinc residues are removed and the leuco sulfuric acid ester of the dyestuff is salted out by adding sodium chloride.

Instead of zinc dust and acetic acid there may also be used 7 parts of iron powder and 10 parts of hydrogen chloride.

Example 7

14 parts of zinc dust and 16 parts of anhydrous acetic acid are introduced in succession into a mixture of 20 parts of finely dispersed 4,5′-dibenzoylamino-1,1′-dianthrimide-2,2′-carbazole and 220 parts of ethylene chloride. The mixture is stirred for 6 hours at 40° C. in a nitrogen atmosphere. At this temperature there is added a sulfatizing mixture prepared at 0° C. from 100 parts of ethylene chloride, 120 parts of N-methylacetamide and 60 parts of sulfur trioxide. The mixture is stirred for 15 minutes at 55° C., the reaction mixture is then introduced into an excess of aqueous sodium carbonate solution, and the leuco sulfuric acid ester is isolated as described in Example 1.

Example 8

95 parts of methylene chloride, 10 parts of 1,5-dibenzoylaminoanthraquinone, 7 parts of zinc dust and 8 parts of anhydrous acetic acid are stirred together for 4 hours at 40° C. When the reduction is complete, there is added a mixture prepared at 0° C. from 50 parts of methylene chloride, 60 parts of N-methylacetamide and 30 parts of sulfur trioxide, and the whole is stirred for further 15 minutes at 40° C. The ester is isolated as described in Example 1.

Example 9

7 parts of zinc dust and 8 parts of anhydrous acetic acid are added to a mixture of 210 parts of ethylene chloride and 10 parts of finely dispersed 1,1′-dianthrimide-2,2′-carbazole, and the whole is stirred for 5 hours at 40° C. At this temperature there is added a mixture of 50 parts of ethylene chloride, 60 parts of N-methylpropionamide and 25 parts of sulfur trioxide and the whole is stirred for further 15 minutes at 45° C. The leuco sulfuric acid ester is then isolated as described in Example 1.

Example 10

A mixture prepared at 0° C. from 120 parts of N-methylpropionamide, 100 parts of ethylene chloride and 60 parts of sulfur trioxide is added at 40° C. to a suspension of 21 parts of leuco-1,1′,5,1″-trianthrimide-2,2′,6,2″-carbazole in 175 parts of ethylene chloride. The esterification mixture is stirred for 15 minutes at 50° C. and then poured into an excess of sodium carbonate solution of 15% strength. The ethylene chloride is distilled off and the zinc residue is removed by filtration. The leuco sulfuric acid ester is salted out from the filtrate by adding potassium chloride.

Example 11

10 parts of finely dispersed 2-chloro-3-acetylaminoanthraquinone suspended in 125 parts of ethylene chloride are stirred with 7 parts of zinc dust and 8 parts of glacial acetic acid for 4 hours at 40° C. A mixture of 50 parts of ethylene chloride, 60 parts of N-methylacetamide and 25 parts of sulfur trioxide is then added at 40° C. to the red mixture and the whole is stirred for 15 minutes at this temperature. The leuco sulfuric acid ester is isolated by pouring the esterification mixture into sodium carbonate solution, distilling off the solvent and filtering off the residue. The ester is salted out from the filtrate.

*Example 12*

10 parts of finely dispersed 1,1'-dianthrimide-2,2'-carbazole, 7 parts of zinc dust, 8 parts of anhydrous acetic acid and 230 parts of ethylene chloride are stirred for 6 hours at 40° C. in a nitrogen atmosphere. When the reduction is complete, a sulfatizing mixture prepared at 0° C. from 60 parts of N-n-butylacetamide, 50 parts of ethylene chloride and 30 parts of sulfur trioxide is added thereto. After stirring for 15 minutes the mixture is poured into 470 parts of an aqueous sodium carbonate solution of 15% strength. The ethylene chloride is removed under reduced pressure, the zinc carbonate is filtered off, and the potassium salt of the leuco sulfuric acid ester is isolated from the filtrate by adding potassium chloride. The ester salt is made into a paste with molasses, sodium carbonate and urea. The paste is converted into a stable yellow power when it is dried under reduced pressure.

Instead of 1,1'-dianthrimide-2,2'-carbazole there may also be used 10 parts of 1,1',5,1''-trianthrimide-2,2',6,2''-carbazole.

*Example 13*

7 parts of zinc dust and 8 parts of glacial acetic acid are added to a suspension of 10 parts of finely dispersed dimethoxydibenzanthrone in 80 parts of ethylene chloride, and the mixture is then stirred for 6 hours at 40° C. At the same temperature there is then added a mixture of 100 parts of ethylene chloride, 60 parts of symmetrical dimethyl urea and 28 parts of sulfur trioxide and the whole is stirred for 1 hour at 55° C. The reaction mixture is poured into an aqueous sodium carbonate solution and the ester is isolated as described in Example 4.

*Example 14*

A mixture of 200 parts of ethylene chloride, 125 parts of symmetrical dimethyl urea and 62.5 parts of sulfur trioxide is added at 40° C. to a suspension of 25 parts of leuco-1,1',5,1''-trianthrimide-2,2',6,2''-carbazole in 275 parts of ethylene chloride. The mixture is stirred for 20 minutes at 55° C., introduced into an excess of an aqueous sodium carbonate solution and the leuco sulfuric acid ester is isolated as described in Example 3.

We claim:

1. In the process for preparing leuco sulfuric acid esters of vat dyestuffs selected from the group consisting of unsubstituted anthrimide carbazoles, benzoylamino-substituted anthrimide carbazoles, alkoxy-substituted dibenzanthrones, halogen-substituted dibenzpyrene-7,14-diones, substituted thioindigo dyes and acylamino-substituted anthraquinones by reaction with a compound of the group consisting of sulfur trioxide and compounds yielding sulfur trioxide, the improvement which consists in carrying out said reaction at a temperature of about 10° C. to 60° C. in the presence of an organic carboxylic acid amide having a formula of the group consisting of the following two formulae

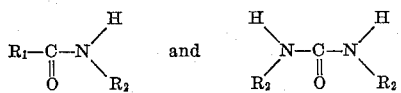

wherein $R_1$ and $R_2$ represent lower alkyl groups.

2. The process as claimed in claim 1, wherein the reaction is carried out in the presence of an inert organic diluent.

3. The process as claimed in claim 1, wherein the reaction is carried out in the presence of a diluent selected from the group consisting of acetone, methylene chloride, chlorobenzene, ethylene chloride and benzene.

4. In the process for preparing the leuco sulfuric acid ester of 1,1',5,1''-trianthrimide-2,2'6,2''-carbazole, the step which consists in contacting the leuco compound of said vat dyestuff at a temperature of about 40° C. to 60° C. with sulfur trioxide, N-methylacetamide and ethylene chloride.

5. In the process for preparing the leuco sulfuric acid ester of 4,5'-dibenzoylamino-1,1'-dianthrimide-2,2'-carbazole, the step which consists in contacting the leuco compound of said vat dyestuff at a temperature of about 50° C. to 60° C. with sulfur trioxide, N-methylacetamide and ethylene chloride.

6. In the process for preparing the leuco sulfuric acid ester of 1,5-dibenzoylamino anthraquinone, the step which consists in contacting the leuco compound of said vat dyestuff at a temperature of about 40° C. with sulfur trioxide, N-methylacetamide and methylene chloride.

7. A process as defined in claim 1 wherein the amide is N-methylacetamide.

8. A process as defined in claim 1 wherein the amide is N-methylpropionamide.

9. A process as defined in claim 1 wherein the amide is N-butylacetamide.

10. A process as defined in claim 1 wherein the amide is N,N'-dimethyl urea.

References Cited in the file of this patent

UNITED STATES PATENTS

| | | |
|---|---|---|
| 2,506,580 | Coffey et al. | May 9, 1950 |
| 2,604,477 | Coffey et al. | July 22, 1952 |
| 2,660,580 | Von | Nov. 24, 1953 |
| 2,685,582 | Coffey et al. | Aug. 3, 1954 |
| 2,784,198 | Peyer | Mar. 5, 1957 |
| 2,837,530 | Oppliger et al. | June 3, 1958 |